(12) United States Patent
Mathison et al.

(10) Patent No.: US 10,327,177 B1
(45) Date of Patent: Jun. 18, 2019

(54) DYNAMIC SERVICE AND POLICY CONTROL BASED ON RADIO CONDITION NOTIFICATIONS

(71) Applicant: Verizon Patent and Licensing Inc., Arlington, VA (US)

(72) Inventors: James Mathison, Warren, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/916,732

(22) Filed: Mar. 9, 2018

(51) Int. Cl.
  *H04W 28/24* (2009.01)
  *H04W 28/02* (2009.01)
(52) U.S. Cl.
  CPC ....... *H04W 28/24* (2013.01); *H04W 28/0247* (2013.01); *H04W 28/0257* (2013.01); *H04W 28/0268* (2013.01)
(58) Field of Classification Search
  CPC ............. H04W 28/24; H04W 28/0247; H04W 28/0257; H04W 28/0268
  See application file for complete search history.

(56) References Cited

U.S. PATENT DOCUMENTS

| | | | |
|---|---|---|---|
| 10,200,543 B2* | 2/2019 | Senarath | H04M 15/8016 |
| 2013/0102277 A1* | 4/2013 | Stenfelt | H04W 4/24 |
| | | | 455/406 |
| 2018/0098276 A1* | 4/2018 | Livanos | H04W 4/025 |
| 2018/0219789 A1* | 8/2018 | Chaudhuri | H04L 47/31 |

* cited by examiner

*Primary Examiner* — Duc C Ho

(57) ABSTRACT

A system for receiving, by a policy and charging rules function (PCRF) device and from a packet data network gateway (PGW) device, a signaling message for a subscriber data session, the signaling message including first radio condition notification (RCN) data identifying an amount/level of data service throughput available at a location with respect to a radio access network (RAN); generating, responsive to the signaling message, a request for the subscriber's quality of service (QoS) and policy information; sending the request for QoS and policy information to a home subscriber server (HSS) device; receiving, from the HSS device, the subscriber's QoS and policies; determining, based on the QoS and policies and the amount/level of data service throughput, QoS and policy decisions applicable to the subscriber at the location; and sending the QoS and policy decisions to the PGW device for implementation via the RAN.

20 Claims, 6 Drawing Sheets

US 10,327,177 B1

DYNAMIC SERVICE AND POLICY CONTROL BASED ON RADIO CONDITION NOTIFICATIONS

BACKGROUND

Wireless communications carriers typically control the quality of service (QoS) parameters and charging treatment for subscribers' usage of network resources, via distributed radio access network (RAN) links, based on real-time determinations made by a dedicated network element (e.g., Policy and Charging Rules Function (PCRF)). Presently, such dedicated network elements have insufficient knowledge of local radio conditions within the RAN and/or of subscriber device capabilities upon which to base the determinations regarding service policies and/or charging policies.

DETAILED DESCRIPTION OF THE PREFERRED EMBODIMENTS

Figure 1:
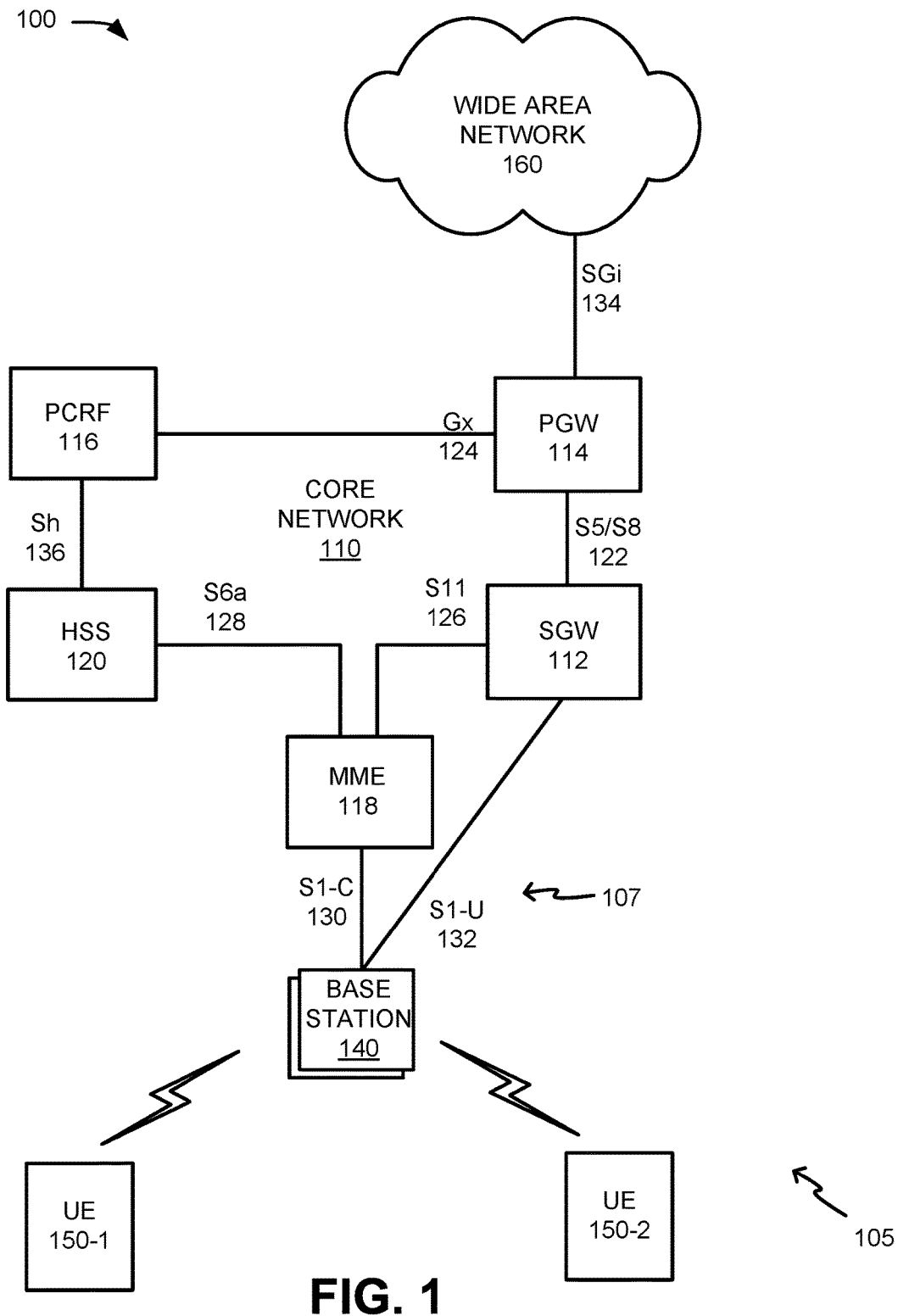
FIG. 1 is a block diagram of an exemplary networking system in which systems and methods described herein may be implemented.

The following detailed description refers to the accompanying drawings. The same reference numbers in different drawings may identify the same or similar elements. The following detailed description does not limit the invention.

Policy and Charging Rules Function (PCRF) network elements generally support service data flow detection, policy enforcement, and flow-based charging. The PCRF provides instructions to a packet data network (PDN) gateway (PGW) device in the carrier's core network (e.g., evolved Packet Core (EPC)) for implementing the applicable service policies and charging rules for each subscriber data session. In determining the guaranteed QoS and appropriate charging treatment, the PCRF considers factors such as the subscriber's pricing plan, current monthly data usage, radio network access technology (e.g., Long-Term Evolution (LTE) vs. Wi-Fi), as well as other factors (e.g., time of day).

Exemplary embodiments described herein enable propagation of radio condition notification (RCN) data from a radio access network (RAN) to a service provider's core network (e.g., evolved Packet Core (EPC)). The RCN data may provide a PCRF element in the core network, with local radio network conditions for a subscriber data session. Based on the RCN data, the PCRF may dynamically identify a level of data service throughput, for example, that is available to a subscriber device at a current location.

Recent enhancements enable wireless carriers in certain instances to provide a higher-speed data service for subscriber data sessions established in one or more coverage areas of an existing RAN, without modifications to the RAN infrastructure. Wireless carriers may deploy, for example, radio acceleration technologies such as LTE-Assisted Access (LAA), in which the RAN uses unlicensed spectrum to provide a supplemental bearer to the subscriber device; carrier aggregation (CA), which enables bundling of multiple bands of licensed spectrum together by the RAN; and other initiatives to define next generation, such as fifth generation (5G) non-stand-alone (NSA) solutions in which the RAN can use 5G technology to provide supplemental bearers to subscriber devices. However, as currently deployed, none of these technologies alert the core network (e.g., the PCRF) is made aware of their availability. This limitation precludes the core network from considering real-time, local radio network conditions in policy decisions regarding QoS and charging treatment for the subscriber data session.

In one embodiment, one or more signaling messages from the RAN to the core network may include RCN data. For example, the RAN may send RCN data in a network connection request from a subscriber device to the core network. During the subsequent subscriber data session, the RAN may send updated RCN data in one or more signaling messages to the core network to identify changes to the local radio environment based on monitoring. In other embodiments, the RAN may alternatively generate and send RCN messages to the core network independently of other signaling messages.

The core network (e.g., PCRF) may use the RCN data (initial and updated) together with applicable policies (e.g., retrieved from a home subscriber server (HSS) device in the core network) to dynamically determine QoS guarantees and charging treatment at different points during the subscriber data session. In some embodiments, the RCN data may be technology-independent, for example, without specifying the one or more radio acceleration technologies (e.g., LAA, CA, etc.) supported in the local radio environment. The PCRF may provide the QoS and subscription information to a PGW in the core network, and the PGW may forward QoS instructions to the RAN.

FIG. 1 is a block diagram of an exemplary networking system 100 in which systems and methods described herein may be implemented. Networking system 100 may include wireless network 105, and a Wide Area Network (WAN) 160. While wireless network 105 is shown in the context of a Long Term Evolution (LTE) network, it should be appreciated that embodiments presented herein may operate in any appropriate wireless network(s).

Wireless network 105 may include one or more devices that are physical and/or logical entities interconnected via standardized interfaces. Wireless network 105 provides wireless packet-switched services and wireless Internet Protocol (IP) connectivity to mobile devices such as subscriber User Equipment (UEs) 150-1 and 150-2 (as used herein, collectively referred to as "UE 150" and generically as "UE 150") during data, voice, and/or multimedia sessions. Wireless network 105 may further connect to one or more other types of communication devices. Wireless network 105 may include one or more packet core network 110 (e.g., evolved Packet Cores (EPC)) and radio access network (RAN) 107 (e.g., an evolved Universal Mobile Telecommunications System (UMTS) Terrestrial Radio Access Networks (eU-TRAN)).

Packet core network 110 may include one or more serving gateways (SGW) 112, packet data network (PDN) gateways (PGW) 114, Policy and Charging Rules Function (PCRF) nodes or elements 116 (also referred to herein simply as "PCRF 116"), and home subscriber server (HSS) devices 120. RAN 107 may include one or more base stations 140, such as an eNodeB, and one or more mobility management entity (MME) devices 118.

It is noted that FIG. 1 depicts a representative networking system 100 with exemplary components and configuration shown for purposes of explanation. Other embodiments may include additional or different network entities in alternative configurations than those which are shown in FIG. 1.

Further referring to FIG. 1, each base station 140 may include one or more devices and other components having functionality that allows UE 150 to wirelessly connect to RAN 107 and to communicate using Radio Resource Control (RRC) signaling and non-access stratum (NAS) protocol messages on top of the RRC messages. Base station 140 may interface with core network 110 via an S1 interface, which may be split into a control plane S1-C interface 130 and a data plane S1-U interface 132. Base station 140 may send the NAS messages on top of S1-C interface 130 to MME device 118. S1-U interface 132 may provide an interface between base station 140 and SGW 112 and may be implemented, for example, using a General Packet Radio Service Tunneling Protocol (GTP). Base station 140 may communicate with other base stations (e.g., eNodeBs) via an X2 interface (not shown). The X2 interface may be implemented, for example, with a protocol stack that includes an X2 application protocol and SCTP.

SGW 112 may provide an access point to/from UE 150; handle forwarding of data packets for UE 150; and/or act as a local anchor point during handover procedures between base stations 140. SGW 112 may interface with PGW 114 via an S5/S8 interface 122. S5/S8 interface 122 may be implemented, for example, using GTP.

PGW 114 may function as a gateway to WAN 160 via an SGi interface 134. WAN 160 may include, for example, an IP Multimedia Subsystem (IMS) network, which may provide voice and/or multimedia services to UE 150, based on Session Initiation Protocol (SIP). In some cases, a particular UE 150, while connected to a single SGW 112, may be connected to multiple PGWs 114, one for each packet network with which UE 150 communicates.

PCRF 116 may provide policy control decision-making and flow-based charging control functionalities. PCRF 116 may include a network device, software node, server device, or distributed component. PCRF 116 may provide network control regarding service data flow detection, gating, QoS and flow-based charging, etc. PCRF 116 may determine how a certain service data flow is to be treated, and may ensure that traffic mapping and treatment is in accordance with a corresponding subscription profile. According to implementations described herein, PCRF 116 may determine and apply policies to accomplish one or more of its tasks based on radio condition notification (RCN) data forwarded to PCRF 116 via RAN 107. PCRF 116 may communicate with PGW 114 using a Gx interface 124 which may be implemented, for example, using a Diameter protocol.

MME device 118 may implement control plane processing for wireless network 105. For example, MME device 118 may implement tracking and paging procedures for UE 150; activate and deactivate bearers for UE 150; authenticate a user of UE 150; and/or interface with non-LTE RANs. A bearer may represent a logical channel with particular QoS requirements, as will be discussed in more detail below. MME device 118 may also select a particular SGW 112 for a particular UE 150. A particular MME device 118 may interface with other MME devices (not shown) in core network 110 and may send and receive information associated with UEs, which may allow one MME device to take over control plane processing of UEs serviced by another MME device, if the other MME device becomes unavailable.

MME device 118 may communicate with SGW 112 through an S11 interface 126. S11 interface 126 may be implemented, for example, using GTP. S11 interface 126 may be used to create and manage a new session for a particular UE 150. S11 interface 126 may be activated when MME device 118 needs to communicate with SGW 112, such as when the particular UE 150 attaches to core network 110, when bearers need to be added or modified for an existing session for the particular UE 150, when a connection to a new PGW 114 needs to be created, or during a handover procedure (e.g., when the particular UE 150 needs to switch to a different SGW 112).

HSS device 120 may store information associated with UEs 150 and/or information associated with subscribers associated with UEs 150. For example, HSS device 120 may store subscriber profiles, such as a subscriber profile repository (SPR), which include authentication and/or access authorization information. MME device 118 may communicate with HSS device 120 via an S6a interface 128. S6a interface 128 may be implemented, for example, using a Diameter protocol. PCRF 116 may communicate with HSS device 120 via an Sh interface 136 to obtain a subscriber profile that identifies services (e.g., a prepaid voice service, a prepaid data service, a postpaid voice service, a postpaid data service, a prepaid voice over Internet protocol (VoIP) service, etc.) to which a subscriber, associated with UE 150, has subscribed. The subscriber profile may also identify particular services (e.g., a real time reporting service, a usage control service, etc.) for which the user is eligible under a service plan, and are to be provided when an online charging action is to be performed.

UE 150 may include any mobile device configured to communicate via base station 140 via wireless signals. For example, UE 150 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a media playing device; a portable gaming system; and/or any type of mobile device with wireless communication capability.

WAN 160 may include any type of wired or wireless network covering relatively expansive areas. For example, WAN 160 may include a metropolitan area network (MAN), a Public Switched Telephone Network (PSTN), an ad hoc network, an intranet, the Internet, a fiber optic-based network, a wireless network, and/or a combination of these or other types of networks. WAN 160 may be an IP-based network or utilize Multi-Protocol Label Switching (MPLS), and may include a mesh network (e.g., IEEE 801.11s) and/or or a WiMAX network (e.g., IEEE 802.16). WAN 160 may include one or more circuit-switched networks and/or packet-switched networks.

Still referring to FIG. 1, multiple elements in core network 110 perform various functions for implementing QoS and policy management. In an exemplary implementation, PCRF 116 may be the policy server in core network 110. PCRF 116 may take the available network information and operator-configured policies to create service session-level policy decisions. The decisions, known as Policy and Charging Control (PCC) rules, are forwarded to a policy and charging enforcement function (PCEF) (not shown), which may be associated with PGW 114. The PCEF enforces policy decisions by establishing bearers, mapping service data flows to bearers, and performing traffic policing and shaping.

Although FIG. 1 shows exemplary components of networking system 100, in other implementations, networking system 100 may include fewer components, different components, differently arranged components, or additional components than depicted in FIG. 1. Additionally, or alternatively, one or more components of networking system 100 may perform functions described as being performed by one or more other components.

Figure 2:
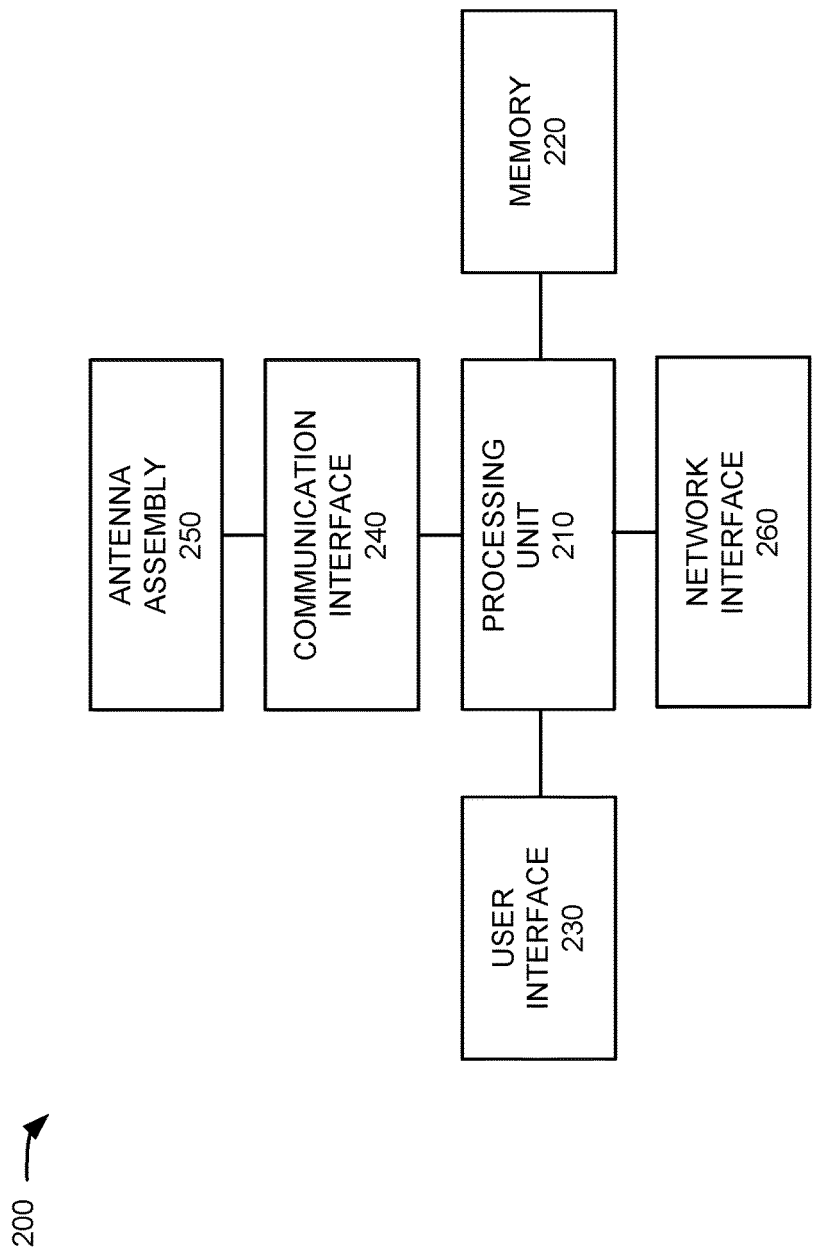
FIG. 2 is a block diagram showing exemplary components of a base station according to an embodiment.

FIG. 2 is a block diagram of a network element 200 that may correspond to one or more devices or components of RAN 107 (e.g., base station 140, MME 118, etc.) according to an embodiment. As shown in FIG. 2, network element 200 may include a processing unit 210, a memory 220, a user interface 230, a communication interface 240, an antenna assembly 250, and a network interface 260.

Processing unit 210 may include one or more processors, microprocessors, application specific integrated circuits (ASICs), field programmable gate arrays (FPGAs), and/or other processing logic. Processing unit 210 may control operation of device 200 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may include mechanisms for inputting information to device 200 and/or for outputting information from device 200. Examples of input and output mechanisms might include a speaker to receive electrical signals and output audio signals; a microphone to receive audio signals and output electrical signals; buttons (e.g., control buttons, a keyboard, or keys of a keypad) and/or a touchscreen to permit data and control commands to be input into device 200; a display, such as an Liquid Crystal Display (LCD), to output visual information; and/or any other type of input or output device. In some embodiments, device 200 may be managed remotely and may not include user interface 230. In other words, device 200 may be "headless" and may not include an input device and/or an output device.

Communication interface 240 may include one or more radio frequency (RF) transceivers that enable device 200 to communicate via wireless communications. An RF transceiver may include an RF transmitter that receives signals to be transmitted wirelessly and performs signal processing on the signals before providing the signals to antenna assembly 250, and an RF receiver that receives signals from antenna assembly 250 and performs signal processing on the received signals before providing the received signals to processing unit 210. For example, the RF transceiver may perform analog-to-digital and digital-to-analog conversion, modulation and demodulation, up-conversion and down-conversion, and/or amplification of signals.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

Network interface 260 may include a logical component that includes input and/or output ports, input and/or output systems, and/or other input and output components that facilitate the transmission of data to other devices, for example, via a backhaul link. For example, network interface 260 may include a network interface card (e.g., Ethernet card) for wired communications and/or a wireless network interface (e.g., a WiFi) card for wireless communications. Network interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described herein, device 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than those depicted in FIG. 2. Additionally, or alternatively, one or more components of device 200 may perform the tasks described as being performed by one or more other components of device 200.

Figure 3:
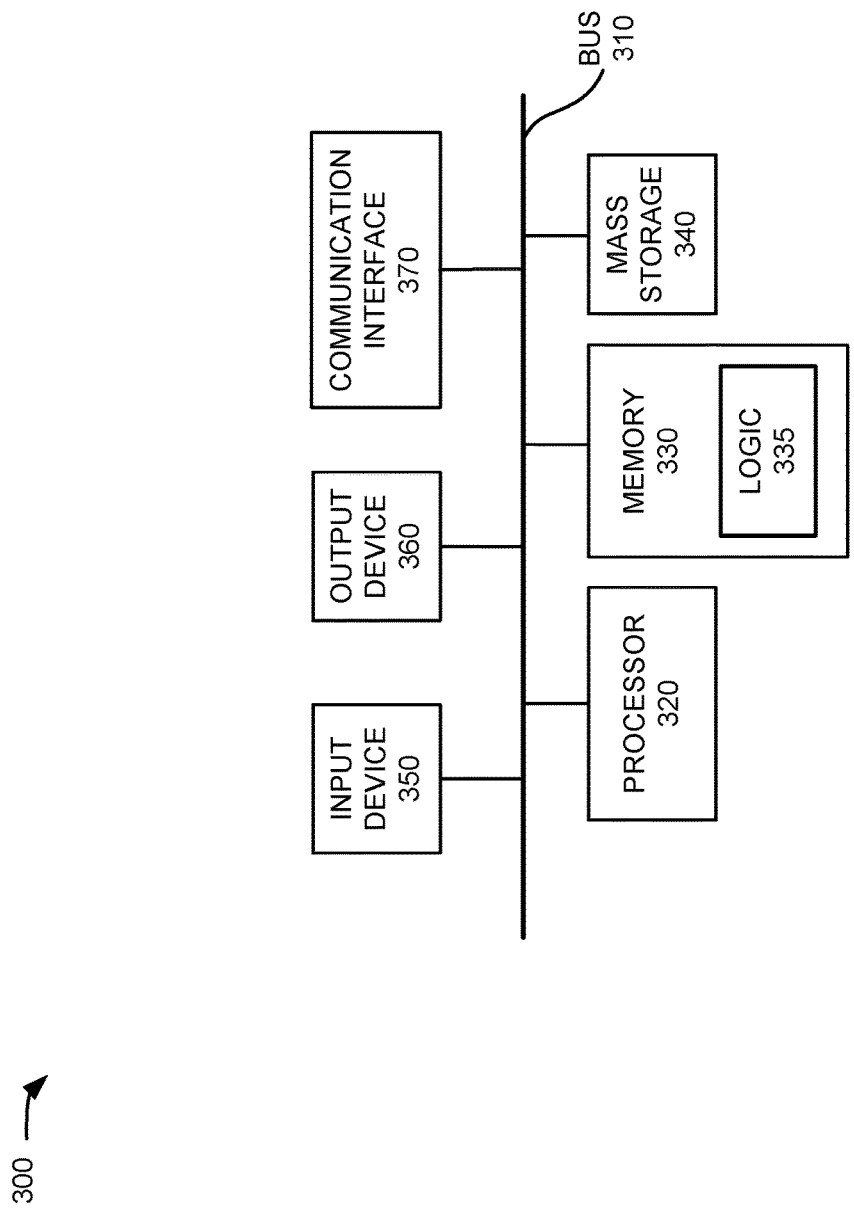
FIG. 3 is a block diagram showing exemplary components of a network device according to an embodiment.

FIG. 3 is a block diagram showing exemplary components of a network element 300, which may correspond to one or more devices/components of core network 110, such as, PCRF 116, SGW 112, PGW 114, and HSS 120. Network element 300 may include bus 310, processor 320, memory 330, mass storage 340, input device 350, output device 360, and communication interface 370.

Bus 310 includes a path that permits communication among the components of network element 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, processor 320 may be an x86 based CPU, and may use any operating system, which may include varieties of the Windows, UNIX, and/or Linux. Processor 320 may also use high-level analysis software packages and/or custom software written in any programming and/or scripting languages for interacting with other network entities that are communicatively coupled to networking system 100.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Memory 330 may include logic 335 that includes instructions (e.g., algorithms) for implementing one or more embodiments described herein. Mass storage device 340 may include any type of on-board device suitable for storing large amounts of data, and may include one or more hard drives, solid state drives, and/or various types of redundant arrays of independent disks (RAID) systems.

Input device 350 may allow an operator to input information into network element 300, as necessary. Input device 350 may include, for example, a keyboard, a mouse, a pen, a microphone, a remote control, an audio capture device, an image and/or video capture device, a touch-screen display, and/or another type of input device. In some embodiments, network element 300 may be managed remotely and may not include input device 350. Output device 360 may output information to an operator of network element 300. Output device 360 may include a display (such as an LCD), a printer, a speaker, and/or another type of output device. In some embodiments, network element 300 may be managed remotely and may not include output device 360.

Communication interface 370 may include a transceiver that enables network element 300 to communicate within networking system 100 with other devices and/or systems. Communications interface 370 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a WiFi) card for wireless communications. Communication interface 370 may also include a universal serial bus (USB) port for communications over a cable, a Bluetooth® wireless interface, an RFID interface, an NFC wireless interface, and/or any other type of interface that converts data from one form to another form.

As described below, network element 300 may perform certain operations relating to a network device (e.g., PCRF 116, MME 118) and/or gateway (e.g., SGW 112 and/or PGW 114) operations, and/or providing user subscription and service information when embodied as HSS 120. Network element 300 may perform various operations in response to processor 320 executing software instructions contained in a computer-readable medium, such as memory 330 (e.g., logic 335) and/or mass storage 340. The software instructions may be read into memory 330 from another computer-readable medium or from another device. The software instructions contained in memory 330 may cause processor 320 to perform processes described herein, such as, for example, process 500 described in FIG. 5. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of network element 300, in other implementations, network element 300 may include fewer components, different components, additional components, or differently arranged components than depicted in FIG. 3.

Figure 4:
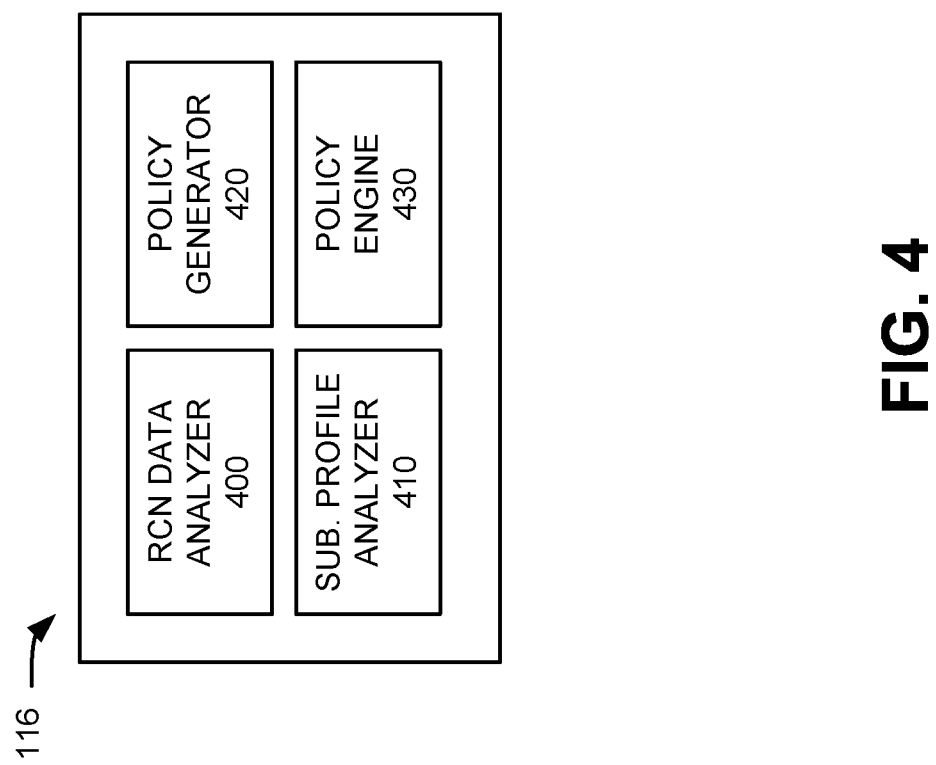
FIG. 4 is a block diagram illustrating exemplary functional components of the PCRF device of FIG. 1.

FIG. 4 is a block diagram illustrating exemplary functional components of PCRF 116. The functions described in connection with FIG. 4 may be performed by one or more components of device 300 (FIG. 3) (e.g., processor 320). As shown in FIG. 4, PCRF 116 may include radio conditions notification (RCN) data analyzer 400, subscriber profile analyzer 410, policy generator 420, and policy engine 430.

RCN data analyzer 400 may receive and process RCN data that serves as a basis for dynamically generating policy and charging control (PCC) rules. In one implementation, RCN data analyzer 400 may parse a signaling message received via PGW 114 to identify a qualitative state and/or quantitative information describing, for example, an amount of data service throughput available to a subscriber at a current time in a current location of UE 150 with respect to RAN 107, as will be described in greater detail below with reference to process 500 of FIG. 5. RCN data analyzer 400 may output the radio condition information to policy generator 420.

In some embodiments, the RCN data may include, for example, a qualitative description of the current local radio conditions in which UE 150-1 is operating. For example, the RCN data may indicate that UE 150-1 has access to a standard level, a reduced level, or an enhanced level of data throughput. Any number of service levels may be used. In other embodiments, the RCN data may indicate a quantitative level of data throughput that is accessible to UE 150-1, such as data throughput in megabits/second or gigabits/second. In some embodiments, the RCN data may indicate one or more technologies (e.g., LAA, CA, etc.) and/or network conditions (e.g., network failures, maintenance activity, congestion, limited spectrum, etc.) corresponding to the data throughput or bandwidth that is currently accessible to UE 150-1 at its current location with respect to RAN 107.

Subscriber profile analyzer 410 may generate a request to HSS 120 for a subscriber profile matching UE 150 identified in the request for instructions received from PGW 114. Based on the subscriber profile retrieved from HSS 120, subscriber profile analyzer 410 may determine one or more of the subscriber's pricing plan, the subscriber's current billing cycle data usage, the radio access technology, time of day, day of the week, technology capabilities of UE 150, etc. Subscriber profile analyzer 410 may forward the subscriber profile information to policy generator 420.

Policy generator 420 may use RCN information retrieved from RCN data analyzer 400 and subscriber profile information retrieved from subscriber profile analyzer 410 to dynamically determine (e.g., modify, downgrade, upgrade, etc.) policies for a subscriber data session. For example, policy generator 420 may identify a service level classification for a current, local radio environment accessible to UE 150 to determine corresponding policy statements, as will be described in greater detail below with reference to process 500 of FIG. 5. Policy generator 420 may output and/or store the dynamically determined policies as a database, table, flat file structure, etc.

Policy engine 430 may access dynamically determined policies to execute the policies in response to signal messages (e.g., from PGW 114) for UE 150 connection requests, handovers, etc. Policy engine 430 may, for example, communicate with PGW 114 (e.g., using Gx interface 124) to provide policies and/or policy decisions for subscriber data sessions. Policy engine 430 may, for example, use PCRF policies to generate policy and charging control (PCC) rules responsive to requests for instructions from PGW 114, as will be described in greater detail below with reference to process 500 of FIG. 5.

Figure 5:
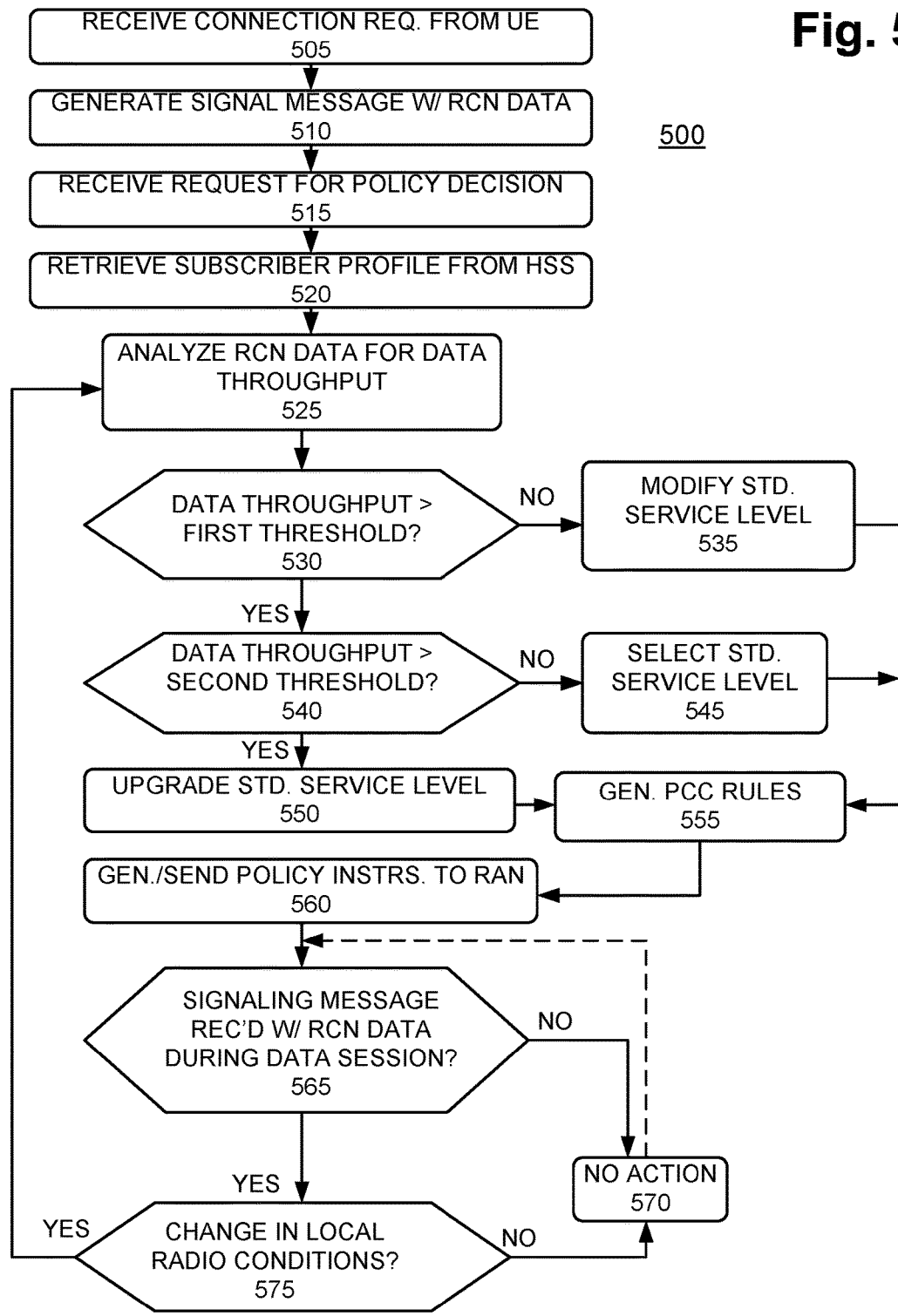
FIG. 5 is a flow chart showing an exemplary process for implementing dynamic QoS and charging policies.

FIG. 5 provides a flow chart illustrating an exemplary process for dynamically implementing dynamic QoS and account policies for a subscriber data session based on a local radio environment. In one implementation, process 500 may be performed on one or more network devices in a service provider's core network 110. In another implementation, process 500 may be performed by elements of core network 110 in conjunction with one or more other devices in RAN 107. The exemplary process of FIG. 5 is described with reference to the messaging/operation diagram of FIG. 6.

Figure 6:
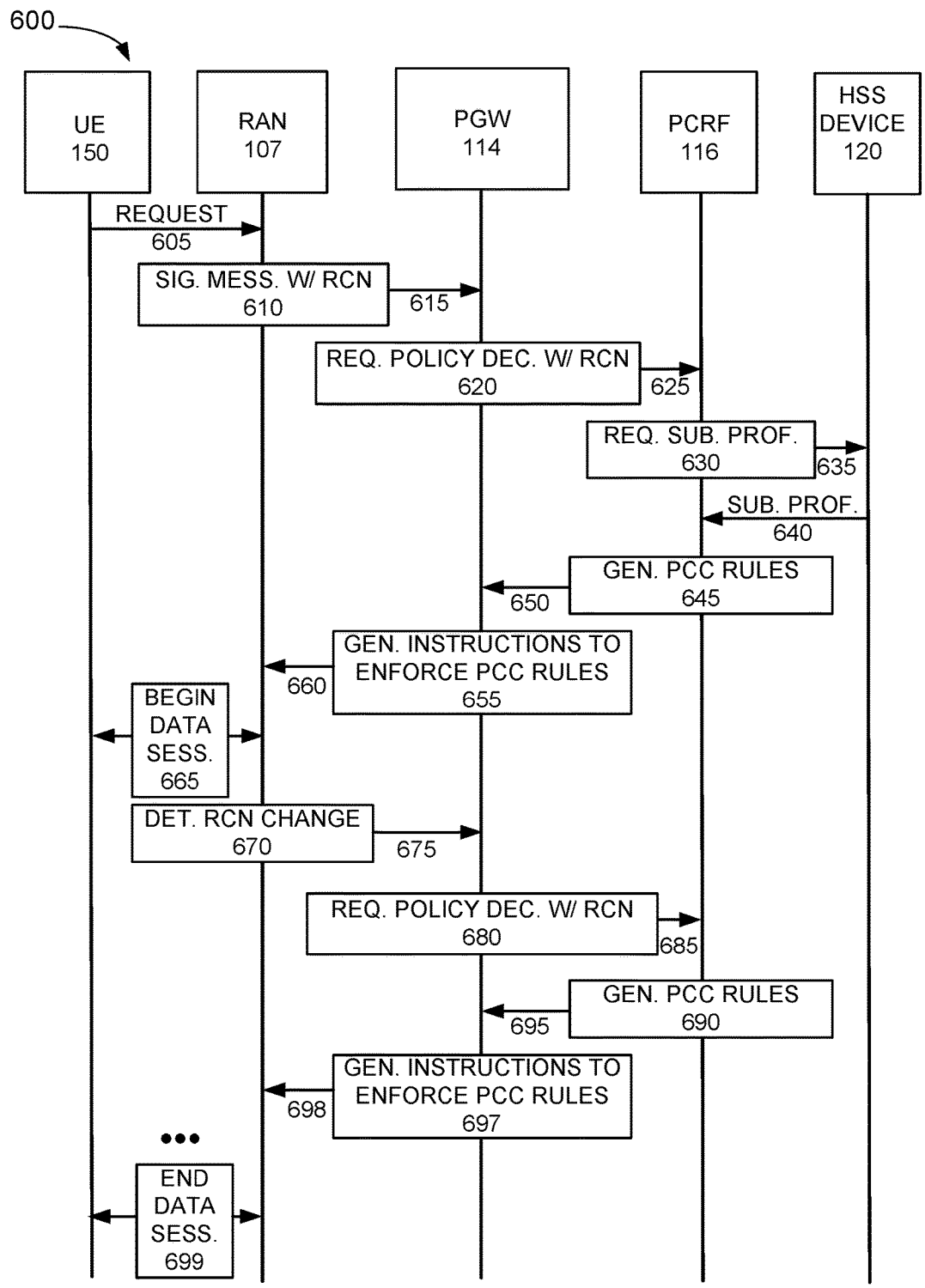
FIG. 6 is an exemplary messaging and signal flow diagram associated with the process of FIG. 5.

Process 500 may include receiving a connection request (or handover request, etc.) at RAN 107 for an identified UE 150 (block 505). For example, MME 118 (via S1-interface 130 from base station 140) may receive and process a request to establish a new data session from a subscriber associated with UE 150-1. FIG. 6 depicts UE 150 sending 605 connection request from a local radio environment to RAN 107.

Process 500 may further include RAN 107 generating a signaling message for UE 150-1, which includes radio condition notification (RCN) data that describes a local radio environment in which UE 150-1 is located (block 510). For example, base station 140 and/or MME 118 may modify or extend existing standards to propagate RCN data for inclusion in the signaling message, which corresponds to local radio conditions (e.g., bandwidth or data service throughput availability, etc.). RAN 107 may send the signaling message with the RCN data to core network 110. FIG. 6 depicts RAN 107 generating 610 and sending 615 (via S11 interface 126 to SGW 112) a signaling message to PGW 114 via S5/S8 interface 122, for example.

PGW 114 may receive the signaling message (e.g., via SGW 112), use the signaling message to generate a request, including the RCN data, for a policy decision, and send the request to PCRF 116 (block 515). FIG. 6 depicts PGW 114 generating 620 and sending 625 a request for instructions with the RCN data to PCRF 116 via interface Gx 124, for example.

In response to the request, which identifies UE 150-1 and/or the subscriber, subscriber profile analyzer 410 may retrieve the corresponding subscriber profile from HSS device 120 (block 520). FIG. 6 depicts PCRF 116 (e.g., subscriber profile analyzer 410) generating 630 and sending 635 a request for the subscriber profile for the subscriber associated with UE 150 to HSS device 120 via Sh interface 136, for example.

RCN data analyzer 410 may analyze the RCN data to determine the local radio conditions for the requested data session for UE 150-1 (block 525). FIG. 6 depicts HSS device 120 retrieving the subscriber profile from, for example, a subscriber profile registry, and sending 640 the subscriber profile to PCRF 116 via Sh 136 interface, for example.

Policy generator 420 may determine, based on the RCN data, whether the radio conditions or the expected data throughput exceeds a first threshold level (block 530). The first threshold level may be the lowest data throughput level of a multiple threshold level scale and be determined by RAN 107 or policy generator 420, for example. If policy generator 420 determines that the current radio conditions/ data throughput does not exceed the first threshold level (block 530—NO), then policy generator 420 may dynamically modify the standard service level that is applicable to UE 150-1 (block 535). For example, policy generator 420 may use the subscriber profile retrieved from HSS 120 and downgrade a current service level that is otherwise applicable to UE 150-1 under the subscription plan. Policy engine 430 may execute a policy that corresponds to the modification and generate a corresponding policy and charging control (PCC) rule (block 555). FIG. 6 depicts policy engine 430 generating 645 PCC rules and sending 650 the PCC rules to PGW 114 via Gx interface 124, for example.

If policy generator 420 alternatively determines that the current radio conditions/data throughput does exceed the first threshold level (block 530—YES), then policy generator 420 may determine whether the radio conditions/data throughput exceeds a second threshold level (block 540). The second threshold level may be an intermediate data throughput level of the multiple threshold level scale as determined by RAN 107 or policy generator 420, for example. If policy generator 420 determines that the current radio conditions/data throughput does not exceed the second threshold level (block 540—NO), then policy generator 420 may set the standard service level that is applicable to UE 150-1 (block 545). For example, policy generator 420 may use the subscriber profile retrieved from HSS 120 and apply a current service level that is currently applicable to UE 150-1. In some cases, setting the service at this level may be substantially similar to policy and charging treatment where no RCN data is received and/or used in the policy decision-making. Policy engine 430 may execute a policy that corresponds to the selection and generate a corresponding PCC rule (block 555). FIG. 6 depicts policy engine 430 generating 645 PCC rules and sending 650 the PCC rules to PGW 114 via Gx interface 124, for example.

If policy generator 420 determines that the current radio conditions/data throughput does exceed the second threshold level (block 540—YES), then policy generator 420 may dynamically upgrade the standard service level that is applicable to UE 150-1 (block 550). For example, policy generator 420 may use the subscriber profile retrieved from HSS 120 and apply an enhanced service level that is currently available to UE 150-1. Policy engine 430 116 may execute a policy that corresponds to the upgrade and generate a corresponding PCC rule (block 555). FIG. 6 depicts policy engine 430 generating 645 PCC rules and sending 650 the PCC rules to PGW 114 via Gx interface 124, for example.

Policy engine 430 may forward the PCC rules generated in block 555 to PGW 114 where a policy and charging enforcement function (PCEF) may enforce the PCC rule by establishing bearers and performing traffic policing and shaping for the data session according to instructions generated by the PCEF and forwarded to RAN 107 (block 560). FIG. 6 depicts PGW 114 generating 655 instructions to enforce the PCC rules and sending 660 the instructions (via SGW 112) to RAN 107 via S11 interface 126, for example.

During the subscriber data session 665 between UE 150 and RAN 107 described in FIG. 6, core network 110 (e.g., PGW 114 and/or PCRF 116) may determine whether subsequent signaling messages received from RAN 107 include additional RCN data (block 565). If no additional RCN data is received (block 565—NO), PCRF 116 may take no additional action with respect to the service level applied to the subscriber data session (block 570). Core network 110 may periodically repeat block 565 throughout subscriber data session 665 based on receipt of additional RCN data.

Periodically and/or based on a triggering event (e.g., detected relocation of UE 150 within RAN 107), RAN 107 may send additional signaling messages with RCN data to core network 110 during the subscriber data session. When additional RCN data is received at core network 110 (block 565—YES), PCRF 116 and/or PGW 114 may determine whether the RCN data corresponds to a change to the local radio conditions from previous conditions (block 575). When PCRF 116 and/or PGW 114 determine that the RCN data does not correspond to a change to the local radio conditions from previous conditions (block 575—NO), PCRF 116 may take no additional action with respect to the service level applied to the subscriber data session (block 570).

When PCRF 116 and/or PGW 114 determine that the RCN data does correspond to a change to the local radio conditions from previous conditions (block 575—YES), PCRF 116 may dynamically reset the policy and charging treatment for the subscriber data session by returning, for example, to block 525 in process 500. For example, UE 150 may be a mobile device and subscriber may have relocated within RAN 107 or to another RAN, for example, where radio acceleration technologies (e.g., LAA, CA, etc.) are no longer (or are now) available to UE 150. Alternatively, radio network conditions may have deteriorated (or improved) in the local radio environment in which UE 150 is attached to RAN 107. FIG. 6 depicts RAN 107 detecting 670 a change in RCN data and sending 675 (via SGW 112) the signaling message with the RCN data to PGW 114 via S5/S8 interface 122, for example.

In response to the updated RCN data, PGW 114 may receive the signaling message (e.g., via SGW 112), use the signaling message to generate another request, including the additional RCN data, for another policy decision, and send the other request to PCRF 116 (block 515). FIG. 6 depicts PGW 114 generating 680 and sending 685 another request for instructions with the RCN data to PCRF 116 via interface Gx 124, for example.

In response to the request received from PGW 114, PCRF 116 may perform various operations in blocks 525-555 as described above to generate other PCC rules for the subscriber data session to allow for dynamic adjustment of QoS for an ongoing data session, such as upgrade/downgrade the QoS based on the particular changed local radio conditions as reflected in the RCN data. FIG. 6 depicts policy engine 430 generating 690 rules and sending 695 the PCC rules to PGW 114 via Gx interface 124, for example. It should be noted that PCRF 116 may not need to communicate with HSS device 122 again after the subscriber profile was initially obtained.

At PGW 114, the PCEF may enforce the PCC rules by establishing bearers and performing traffic policing and shaping for the data session according to instructions generated by the PCEF and forwarded to RAN 107 (block 560). FIG. 6 depicts PGW 114 generating 697 instructions and enforce the PCC rules and sending 698 the instructions (via SGW 112) to RAN 107 via S11 interface 126, for example. The dynamic updating of the policy and charging treatment for the subscriber data session may be performed any number of times before the data session is ended 699 to thereby allowing the subscriber to receive the best possible service based on the various local radio conditions in which UE 150 operates.

The embodiments described herein allow wireless service providers to implement dynamic policy and charging control based on an assessment of local radio environments to influence desired network behavior. As a result, wireless carriers may customize service options, for example, in the ever-expanding number of geographic areas that support radio acceleration technologies such as LTE-Assisted Access (LAA), Carrier Aggregation (CA), and others. For example, carriers may downgrade, upgrade, or otherwise modify QoS policy and/or charging treatment under an enterprise subscriber's service plan per the subscriber profile. Thus, requests for connections, handover, etc., that include RCN data may have QoS policies and charging treatment enforced for a subscriber device which differ from the QoS policies and charging treatment enforced for a different subscriber device operating in a same location and where no RCN data accompanies the request, even though the applicable subscription plans are substantially identical and the subscriber profiles are substantially similar.

Implementations of the dynamic policy and charging control (PCC) may allow a service provider to provide higher video resolution for subscribers in high throughput locations, for example, and/or implement differential data charging based on an assessment of the RCN data. For example, if a subscriber experiences worse than subscribed-for data performance, the service provider may compensate the subscriber for the lower service quality, or alternatively, increase the data charge to encourage subscribers to postpone optional data applications until such time as more bandwidth throughput becomes available.

Other implementations of the dynamic PCC may allow a service provider to adjust the handling of sponsored data for subscribers based on a current level of available throughput. A service provider may promote/inhibit background data transmissions for enterprise subscribers (e.g., large deployers of Internet of things (IoT) devices) based on local radio conditions that change as a function of time. A service provider may increase/decrease priority of certain subscribers based on pricing plan when they are connected via locations of varying available bandwidth. Use of RCN data may permit any number of servicing options for a service provider that are not available under existing techniques for PCC control.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIG. 5 and a series of signal flows with respect to FIG. 6, the order of the blocks and signal flows may be modified in other embodiments. Further, non-dependent blocks may be performed in parallel.

Certain features described above may be implemented as "logic," a "module," or a "unit" that performs one or more functions. This logic, module, or unit may include hardware, such as one or more processors, microprocessors, application specific integrated circuits, or field programmable gate arrays, software, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a policy and charging rules function (PCRF) device and from a packet data network gateway (PGW) device, a first signaling message for a first data session of a first user device, wherein the first signaling message includes first radio condition notification (RCN) data identifying a first amount or level of data service throughput available to the first user device at a first location with respect to a radio access network (RAN);
   generating, by the PCRF device responsive to the first signaling message, a request for quality of service (QoS) and policy information associated with the first user device;
   sending, by the PCRF device, the request for QoS and policy information to a home subscriber server (HSS) device;
   receiving, by the PCRF device from the HSS device, a first plurality of QoS and policies associated with the first user device;
   determining, by the PCRF device and based on the first plurality of QoS and policies and the first amount or level of data service throughput, first QoS and policy decisions that are applicable to the first user device at the first location; and
   sending, by the PCRF device, the first QoS and policy decisions to the PGW device for implementation via the RAN.

2. The method of claim 1, wherein the first amount or level of data service throughput corresponds to a first qualitative level of multiple qualitative levels of data service throughput, the method further comprising:
   selecting, from among the first plurality of QoS and policies based on the first qualitative level, a first QoS policy and a first policy corresponding to the first QoS and policy decisions.

3. The method of claim 1, wherein determining the first QoS and policy decisions comprises modifying the first plurality of QoS and policies based on the first amount or level of data service throughput.

4. The method of claim 1, further comprising:
   receiving, by the PCRF device and via the PGW device, a second signaling message associated with the first data session for the first user device, wherein the second signaling message includes second RCN data identifying a second amount or level of data service throughput available to the first user device at a second location with respect to the RAN;
   determining, by the PCRF device and based on the first plurality of QoS and policies and the second amount or level of data service throughput, second QoS and policy decisions that are applicable to the first user device at the second location and that differ from the first QoS and policy decisions; and
   sending, by the PCRF device, the second QoS and policy decisions to the PGW device for implementation via the RAN.

5. The method of claim 1, further comprising:
   receiving, by the PCRF device and via the PGW device, a second signaling message associated with the first data session for the first user device, wherein the second signaling message includes second RCN data identifying a second amount or level of data service throughput available to the first user device at the first location at a time that differs from a time of the first signaling message;
   determining, by the PCRF device and based on the first plurality of QoS and policies and the second RCN data, second QoS and policy decisions that are applicable to the first user device at the first location and that differ from the first QoS and policy decisions; and
   sending, by the PCRF device, the second QoS and policy decisions to the PGW device for implementation via the RAN.

6. The method of claim 1, further comprising:
   receiving, by the PCRF device and from the PGW device, a second signaling message associated with a second data session for a second user device, wherein the second signaling message includes second RCN data identifying the first amount or level of data service throughput available to the second user device at the first location, and wherein the first user device and the second user device are associated with different users;
   generating, by the PCRF device responsive to the second signaling message, a request for QoS and policy information associated with the second user device;
   sending, by the PCRF device, the request for QoS and policy information to the HSS device;
   receiving, by the PCRF device from the HSS device, the first plurality of QoS and policies associated with the second user device;
   determining, by the PCRF device and based on the first plurality of QoS and policies and the second RCN data, second QoS and policy decisions that are applicable to the second user device at the first location; and
   sending, by the PCRF device, the second QoS and policy decisions to the PGW device for implementation via the RAN.

7. The method of claim 1, further comprising:
   determining that the first amount or level of data service throughput corresponds to an amount of data service throughput associated with at least one of Long Term Evolution-Assisted Access or Carrier Aggregation.

8. A network device, comprising:
   a communication interface;
   a memory configured to store instructions; and
   a processor, coupled to the communication interface and the memory, wherein the processor is configured to execute the instructions stored in the memory to:
      receive, from a packet data network gateway (PGW) device, a first signaling message for a first data session of a first user device, wherein the first signaling message includes first radio condition notification (RCN) data identifying a first amount or level of data service throughput available to the first user device at a first location with respect to a radio access network (RAN);

generate, responsive to the first signaling message, a
request for quality of service (QoS) and policy
information associated with the first user device;
send the request for QoS and policy information to a
home subscriber server (HSS) device;
receive, from the HSS device, a first plurality of QoS
and policies associated with the first user device;
determine, based on the first plurality of QoS and
policies and the first amount or level of data service
throughput, first QoS and policy decisions that are
applicable to the first user device at the first location;
and
send, to the PGW device, the first QoS and policy
decisions for implementation via the RAN.

9. The network device of claim 8, wherein the first amount or level of data service throughput corresponds to a first qualitative level of multiple qualitative levels of data service throughput, and wherein the processor is further configured to execute the instructions to:
select, from among the first plurality of QoS and policies based on the first qualitative level, a first QoS policy and a first policy corresponding to the first QoS and policy decisions.

10. The network device of claim 8, wherein to determine the first QoS and policy decisions, the processor is further configured to execute the instructions to modify the first plurality of QoS and policies based on the first amount or level of data service throughput.

11. The network device of claim 8, wherein the processor is further configured to execute the instructions to:
receive, via the PGW device, a second signaling message associated with the first data session for the first user device, wherein the second signaling message includes second RCN data identifying a second amount or level of data service throughput available to the first user device at a second location with respect to the RAN;
determine, based on the first plurality of QoS and policies and the second amount or level of data service throughput, second QoS and policy decisions that are applicable to the first identified user device at the second location and that differ from the first QoS and policy decisions; and
send, to the PGW device, the second QoS and policy decisions for implementation via the RAN.

12. The network device of claim 8, wherein the processor is further configured to execute the instructions to:
receive, via the PGW device, a second signaling message associated with the first data session for the first user device, wherein the second signaling message includes second RCN data identifying a second amount or level of data service throughput available to the first user device at the first location at a time that differs from a time of the first signaling message;
determine, based on the first plurality of QoS and policies and the second amount or level of data service throughput, second QoS and policy decisions that are applicable to the first user device at the first location and that differ from the first QoS and policy decisions; and
send, to the PGW device, the second QoS and policy decisions for implementation via the RAN.

13. The network device of claim 8, wherein the processor is further configured to execute the instructions to:
receive, from the PGW device, a second signaling message associated with a second data session for a second user device, wherein the second signaling message includes second RCN data identifying the first amount or level of data service throughput available to the second identified user device at the first location, and wherein the first user device and the second user device are associated with different users;
generate, responsive to the second signaling message, a request for QoS and policy information associated with the second user device;
send, to the HSS device, the request for QoS and policy information;
receive, from the HSS device, the first plurality of QoS and policies associated with the second user device;
determine, based on the plurality of QoS and policies and the second amount or level of data service throughput, second QoS and policy decisions that are applicable to the second user device at the first location; and
send, to the PGW device, the second QoS and policy decisions for implementation via the RAN.

14. The network device of claim 8, wherein the processor is further configured to execute the instructions to determine that the first amount or level of data service throughput corresponds to an amount of data service throughput associated with at least one of Long Term Evolution-Assisted Access or Carrier Aggregation.

15. A non-transitory computer-readable medium, storing instructions executable by one or more processors of a network device which, when executed by the one or more processors, cause the network device to:
receive, from a packet data network gateway (PGW) device, a first signaling message for a first data session of a first user device, wherein the first signaling message includes first radio condition notification (RCN) data identifying a first amount or level of data service throughput available to the first user device at a first location with respect to a radio access network (RAN);
generate, responsive to the first signaling message, a request for quality of service (QoS) and policy information associated with the first user device;
send the request for QoS and policy information to a home subscriber server (HSS) device;
receive, from the HSS device, a first plurality of QoS and policies associated with the first user device;
determine, based on the first plurality of QoS and policies and the first amount or level of data service throughput, first QoS and policy decisions that are applicable to the first user device at the first location; and
send, to the PGW device, the first QoS and policy decisions for implementation via the RAN.

16. The non-transitory computer-readable medium of claim 15, wherein the first amount or level of data service throughput corresponds to a first qualitative level of multiple qualitative levels of data service throughput, comprising one or more instructions that further cause the network device to:
select, from among the first plurality of QoS and policies based on the first qualitative level, a first QoS policy and a first policy corresponding to the first QoS and policy decisions.

17. The non-transitory computer-readable medium of claim 15, wherein to determine the first QoS and policy decisions, the instructions cause the network device to modify the first plurality of QoS and policies based on the first amount or level of data service throughput.

18. The non-transitory computer-readable medium of claim 15, comprising one or more instructions that further cause the network device to:
receive, via the PGW device, a second signaling message associated with the first data session for the first user device, wherein the second signaling message includes second RCN data identifying a second amount or level of data service throughput available to the first user device at a second location with respect to the RAN;

determine, based on the first plurality of QoS and policies and the second amount or level of data service throughput, second QoS and policy decisions that are applicable to the first user device at the second location and that differ from the first QoS and policy decisions; and send, to the PGW device, the second QoS and policy decisions for implementation via the RAN.

19. The non-transitory computer-readable medium of claim 15, comprising one or more instructions that further cause the network device to:

receive, via the PGW device, a second signaling message associated with the first data session for the first user device, wherein the second signaling message includes second RCN data identifying a second amount or level of data service throughput available to the first user device at the first location at a time that differs from a time of the first signaling message;

determine, based on the first plurality of QoS and policies and the second amount or level of data service throughput, second QoS and policy decisions that are applicable to the first user device at the first location and that differ from the first QoS and policy decisions; and send, to the PGW device, the second QoS and policy decisions for implementation via the RAN.

20. The non-transitory computer-readable medium of claim 15, comprising one or more instructions that further cause the network device to:

receive, from the PGW device, a second signaling message associated with a second data session for a second user device, wherein the second signaling message includes second RCN data identifying the first amount or level of data service throughput available to the second user device at the first location, and wherein the first user device and the second user device are associated with different users;

generate, responsive to the second signaling message, a request for QoS and policy information associated with the second user device;

send, to the HSS device, the request for QoS and policy information;

receive, from the HSS device, the first plurality of QoS and policies associated with the second user device;

determine, based on the first plurality of QoS and policies and the second amount or level of data service throughput, second QoS and policy decisions that are applicable to the second user device at the first location; and send, to the PGW device, the second QoS and policy decisions for implementation via the RAN.

\* \* \* \* \*